March 21, 1944.   H. P. MIXER   2,344,627
COMPUTING MACHINE
Filed May 2, 1941   6 Sheets-Sheet 3

INVENTOR
HAROLD P. MIXER
BY John L. Sterling
ATTORNEY

March 21, 1944.    H. P. MIXER    2,344,627
COMPUTING MACHINE
Filed May 2, 1941    6 Sheets-Sheet 4

INVENTOR
HAROLD P. MIXER
BY John L. Sterling
ATTORNEY

March 21, 1944. H. P. MIXER 2,344,627
COMPUTING MACHINE
Filed May 2, 1941 6 Sheets-Sheet 5

INVENTOR
HAROLD P. MIXER
BY John L Sterling
ATTORNEY

March 21, 1944.    H. P. MIXER    2,344,627
COMPUTING MACHINE
Filed May 2, 1941    6 Sheets-Sheet 6

INVENTOR
HAROLD P. MIXER
BY John L. Sterling
ATTORNEY

Patented Mar. 21, 1944

2,344,627

UNITED STATES PATENT OFFICE 2,344,627

COMPUTING MACHINE

Harold P. Mixer, Rockville Centre, N. Y., assignor to Remington Rand Inc., Buffalo, N. Y., a corporation of Delaware Application May 2, 1941, Serial No. 391,447

11 Claims. (Cl. 235—61)

This invention relates to accumulator mechanisms for use in computing machines, and more particularly accumulators of the creep carry type.

The advantages of creep accumulators with differential gearing over snap carry accumulators is well known in the computing machine art. The ability to run in either direction at high speed and at uniform load, and the facility with which digits may be entered in any denominational order, while the carry mechanism is functioning, are features which are valuable to any computing mechanism.

Accumulators using differential gears and the creep means of carrying may be divided into two general classes. One of these classes includes the spur gear arrangement where the carry ratio is obtained by a similar ratio of gear teeth. An example of this class may be found in U. S. Patent No. 2,214,029 issued to H. P. Mixer, September 10, 1940, or in U. S. Patent No. 2,211,736, issued to H. T. Avery, August 13, 1940. The second class includes the eccentric gear arrangement where a carry ratio of 10 to 1 is obtained by the use of an internal gear of 10 teeth in cooperation with an eccentric gear of 9 teeth. An example of this class may be found in U. S. Patent No. 1,828,180, issued to Clyde Gardner on October 20, 1931. The present invention is applicable to both of these classes.

Generally stated, the invention has for its principal object to facilitate the visual reading of totals and the taking of totals by clearing the accumulator, in accumulators of the creep carry type.

One of the objects of the present invention is to rectify the creep increments in a series of reading dials of a creep carry accumulator whereby the correct accumulated amount may be read after each addition.

The above mentioned patent, 1,828,180, is a good example of the prior art computing machines which make use of a creep-crawl accumulator having an internal floating gear. The construction permits a total to be indicated only when the orders are zeroized one after another, starting from the lowest or units order. The present invention has for one of its objects to provide a construction which permits the orders to be zeroized simultaneously regardless of the accumulator position.

A creep carry accumulator can be cleared by engaging it with its actuating racks and advancing said racks simultaneously in subtracting direction each until it is arrested by a stop lug on the resultant wheel engaging a zero stop brought into cooperation therewith, provided each and every one of said wheels stands either in its zero position or advanced additively not more than nine spaces. It is when some wheel registers a fractional amount greater than 9 and less than 10 that the trouble occurs, and especially when that amount is nearly 10. There is a critical zone in the fractional positions of a resultant wheel, between the 9 and 0 positions, where there is at least the danger that the stop would fall in front of the stop lug and arrest the wheel immediately, which has made it necessary to restore the wheels of a creep carry accumulator successively. To bridge this zone is an object of the invention. This is done by providing a latching mechanism for the zero stops which automatically holds the zero stop against engaging any wheel while that wheel stands in the critical zone mentioned. A resultant wheel stands in said zone when that wheel registers 9 and the next lower wheel registers a number large enough to bring the stop lug of the first wheel dangerously close to ten.

To the above and other ends which will appear in the course of the description, the invention resides in certain features of construction and combinations and arrangements of parts, all of which will be fully described herein and particularly pointed out in the claims.

The prior art machines that rectify the creep-crawl accumulator wheels do so by subtracting the creep out of the wheel movements by turning them in a reverse direction. The present invention starts a computing operation by subtracting a unit from the indicator in each denominational order; then, when the amount is to be read or printed, the creep is rectified by adding to each indicator, an amount equal to one-tenth of the ten complement of the amount in the next lower order accumulator wheel.

Other objects and structural details of the invention will be apparent from the following description when read in connection with the accompanying drawings, wherein, Fig. 1 is a side elevation taken from the left side of the machine;

Figure 1:
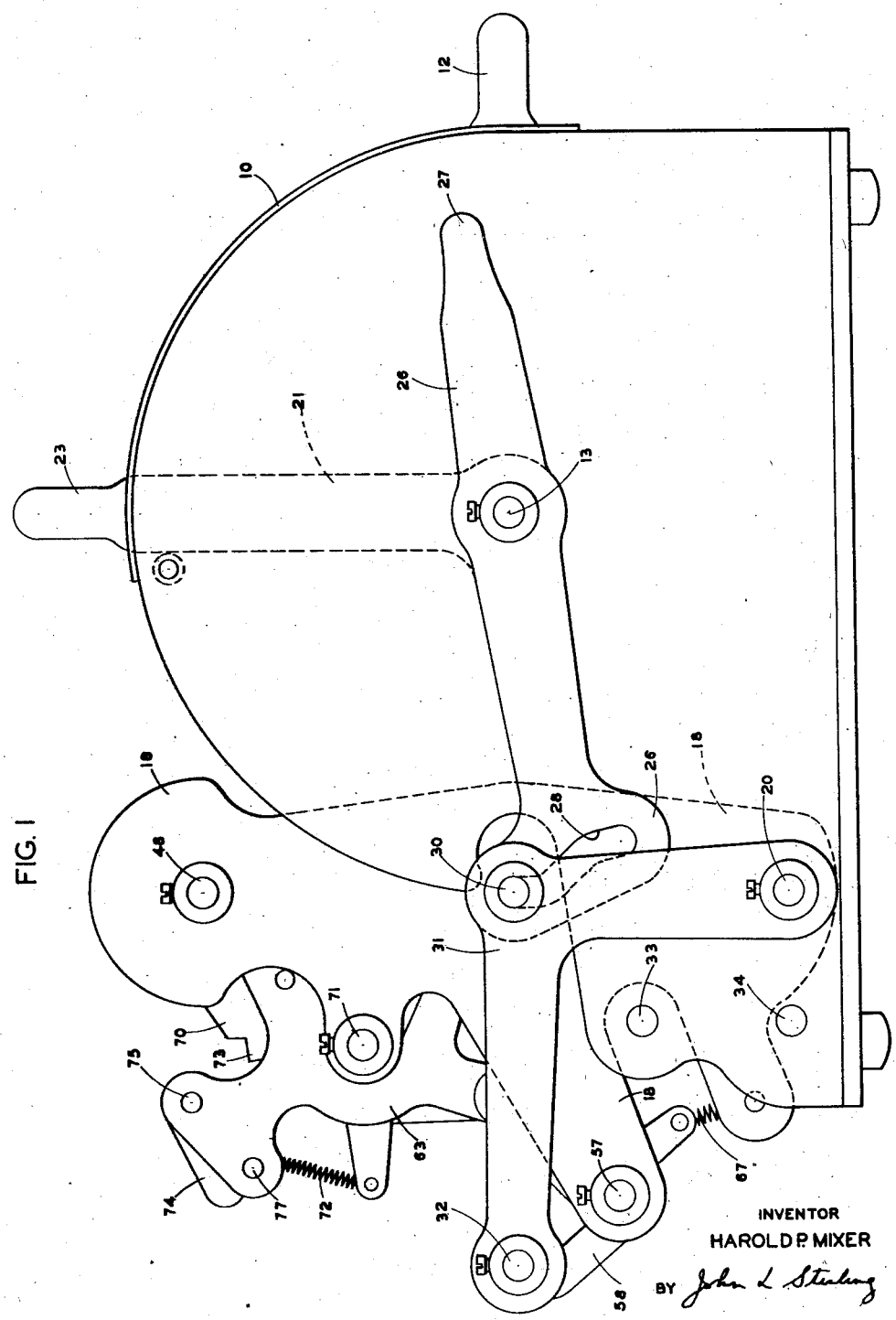
Figure 2:
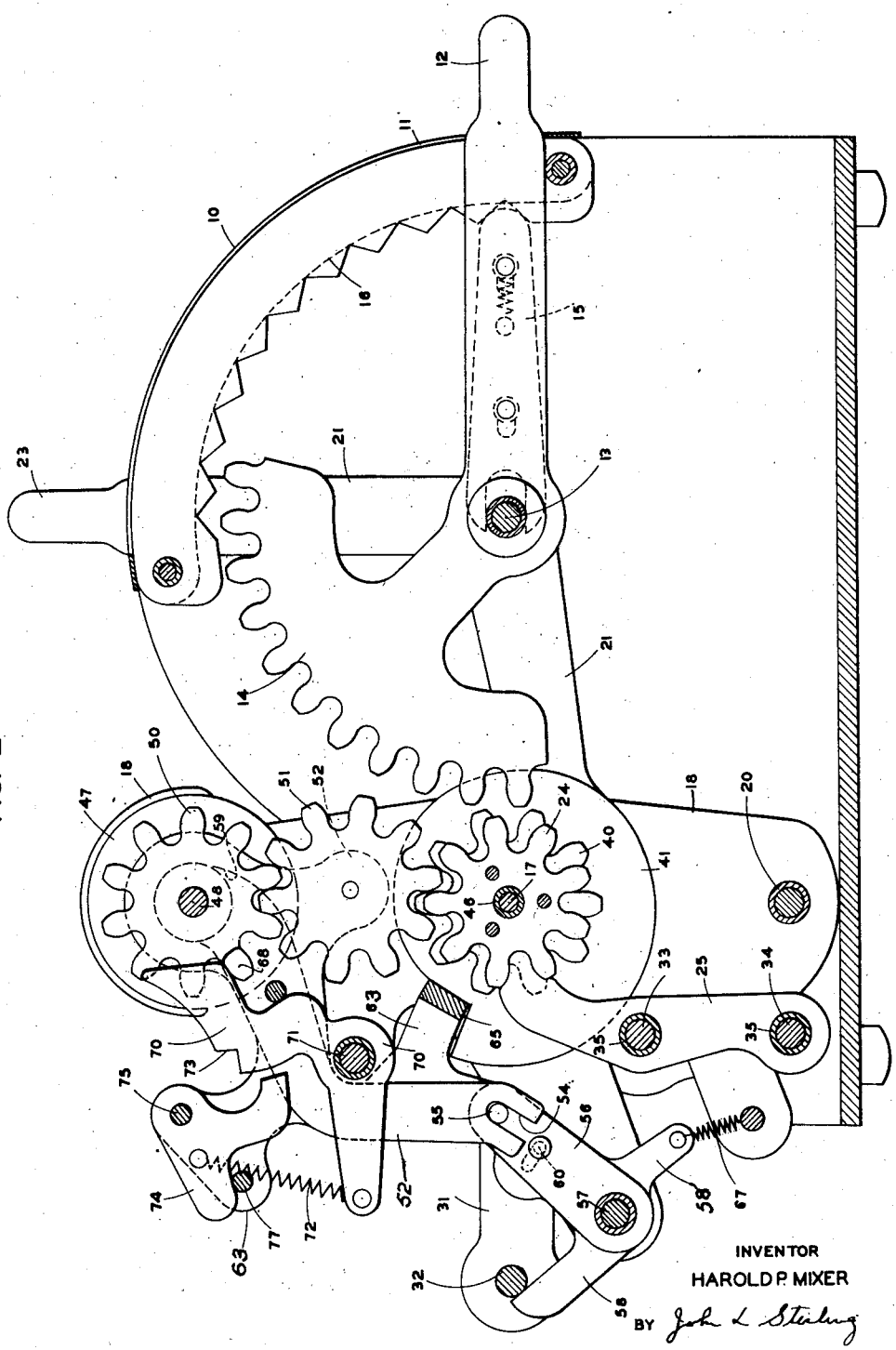
Fig. 2 is a cross sectional view on line 2—2 of Fig. 3 taken from the left and shows most of the operating elements in normal zero position.

Referring now to Figs. 1 and 2, the keyboard consists of a cylindrical shell 10 with slots 11 cut therein. A plurality of key levers 12 are rotatably mounted on a central shaft 13 and are moved in the slots 11 to specified points along the circumference of the shell 10 to enter digits into the accumulator. A gear section 14 (Fig. 2) is provided as an integral part of each key lever 12 for meshing with the accumulator numeral wheels. To insure more accurate placing of the key levers, a detent 15, mounted upon each of said levers with the customary spring-pin-slot combination, is used in cooperation with an internal star wheel segment 16.

This form of keyboard is similar in many respects to commercial cash registers and is well known in the art.

Toward the rear of the machine an accumulator shaft 17 extends transversely for the entire width of the machine and is supported at each end by an irregular flat support 18 (see Fig. 5) which rocks on a shaft 20 journaled near the base of the machine. The shaft 17 extends through the supports 18 a short distance so as to engage cam levers 21 in cam slots 22. Manual movement is imparted to levers 21 by means of a pair of handles 23 which extend upward through slots in the keyboard face. The cam slots 22 are so constructed as to move a series of numeral wheels 24 into engagement with the gear sectors 14 when the handles 23 are moved toward the front of the machine (see Fig. 6). When the handles are moved to the rear, the shaft 17 is cammed back to the position shown in Fig. 2, the numeral wheels are then free of the gear sector 14, but are held securely by a series of detents 25.

The detents 25 are fixedly mounted by means of two rods 33 and 34 and held in spaced relation by a plurality of sleeves 35. One detent is provided for each numeral wheel 24.

The accumulator (see Figs. 2, 4, 6, 7, 8, 9, and 10) is creep-carry, the main parts of which are well known in the art and have been described in several patents. These parts include in each denomination, the nine-toothed numeral wheel 24, a coupling disc 36, an eccentrically mounted or floating gear 37, and an eccentric bearing 38 on a sleeve 46. To these are added a ten-toothed resultant gear 40 and a snail cam 41 which assist in the operation of the reading and clearing mechanism.

As previously stated the geared sectors 14, which enter the amounts, mesh with the nine-toothed numeral wheels 24. To each of these wheels is secured a coupling disc 36 which has three holes 42 cut therein to cooperate with a series of three pins 43 which are attached to the eccentric gear 37.

The floating gear 37 (Fig. 4) has nine notches on its periphery and these mesh with ten pins 44 (acting as internal gear teeth) which are secured to the snail cam 41. Since the tooth spacing is the same for both gears, the floating gear 37 is free to move around within the ten tooth gear under the control of the eccentric bearing 38, gaining one tooth during each revolution of the sleeve 46.

Figure 11:
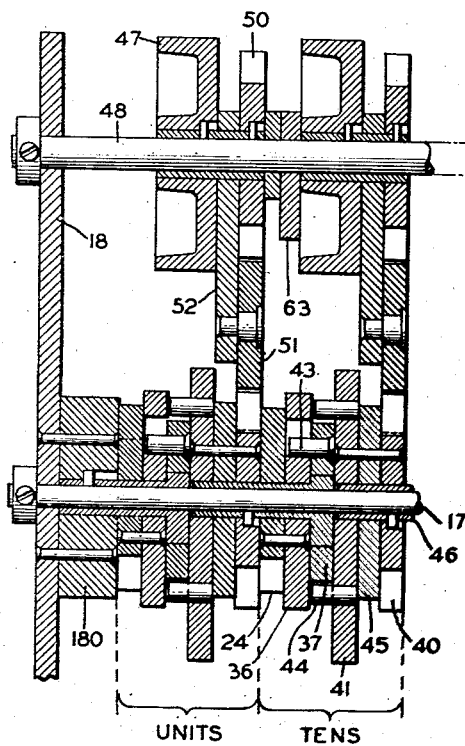
Fig. 11 is a vertical sectional view from the rear and through the axes of the accumulator and the indicator, and showing the units and tens orders of the accumulator and the indicator.

The resultant gear 40 is secured to the snail cam 41. However, in order to make room for certain parts of the reading mechanism a spacer 45 is interposed between them when they are riveted together. The assembly consisting of the cam 41, spacer 45 and gear 40, constitutes the resultant wheel, which is fast on the righthand end of the sleeve 46 which passes through the gear 24, disc 36 and gear 37 of the next higher denomination and has the eccentric 38 fast on its lefthand end. In the units order the sleeve 46 is fixedly anchored to the frame member 18 as indicated at the left in Fig. 11. The resultant gear 40 in any one order is also pinned to the sleeve 46 in the same order so that, when the gear 40 makes one complete revolution, the eccentric bearing 38 causes the floating gear 37 in the next higher order, in cooperation with the internal gear formed by the pins 44, to rotate the higher order snail cam 41 one-tenth of a revolution. This is the usual means of carry in creep-carry accumulators.

The numeral wheel 24 has only nine teeth but it must be turned a total of ten teeth to cause a full rotation of the resultant gear 40. This may easily be understood by considering the coupling between the two wheels. The numeral wheel 24 is secured to the coupling disc 36 which is coupled to the floating gear 37 by the pin and hole combination 42—43. The floating gear 37 has nine teeth while the internal gear has ten teeth 44. As long as the eccentric is held immovable, a ten to nine ratio in rotation is introduced at this point. As the pins 44 are attached to the snail cam which is riveted to the resultant wheel 40, there is always a ten to nine or one and one-ninth ratio between the numeral and resultant wheels. This mode of operation is similar to that of prior creep-carry mechanisms.

Above the accumulator, and in a position which will permit easy observation, is a series of dial indicators 47 rotatably mounted on a shaft 48. Each dial indicator has a cylindrical surface on which is printed digits from 0 to 9, inclusive, and each dial is secured to a ten toothed gear 50 from which it receives its motion.

Figure 3:
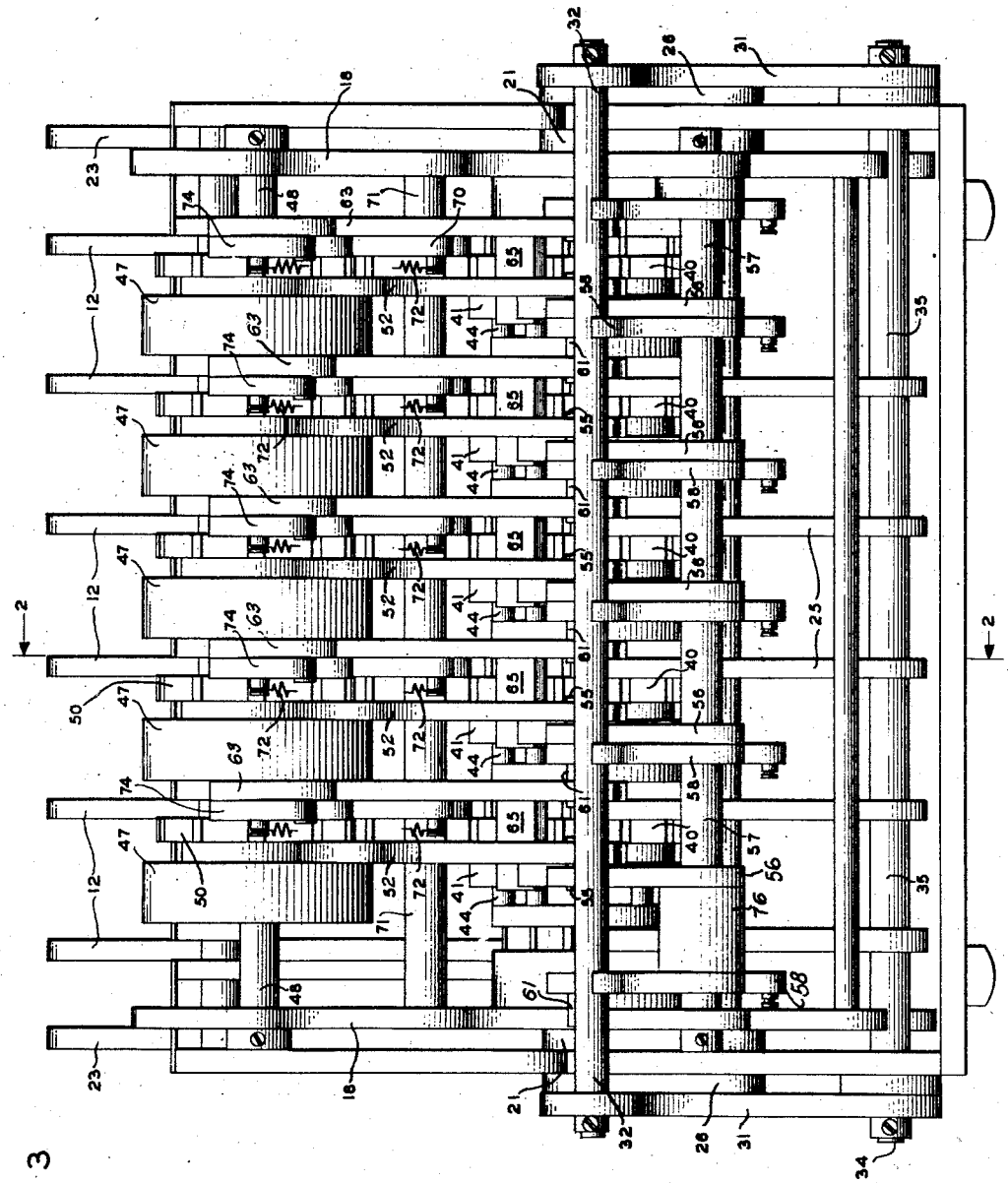
Fig. 3 is an elevation taken from the back.
Figures 4, 5:
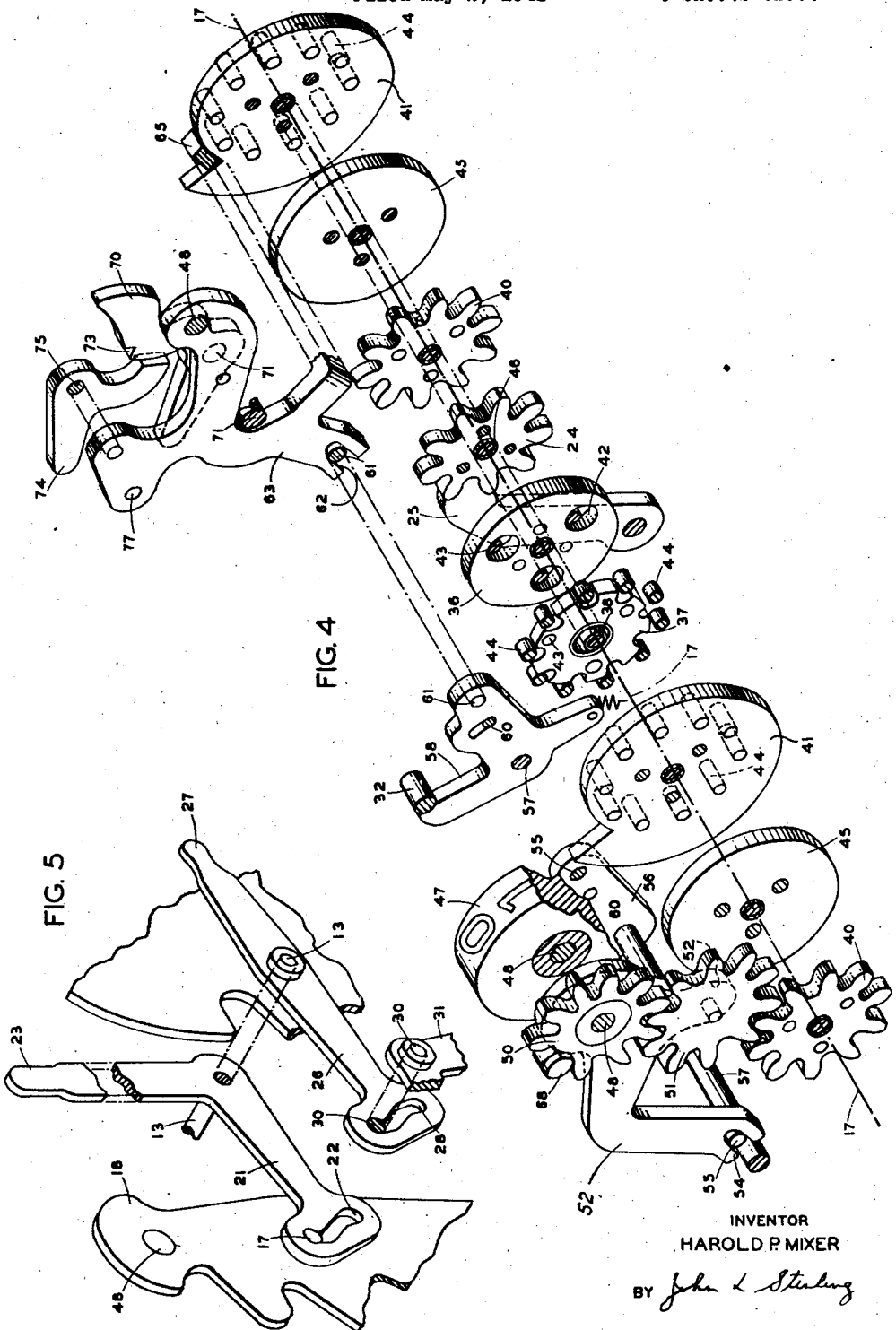
Fig. 4 is an exploded isometric view of the accumulator parts and the reading indicator dial mechanism.
Fig. 5 is an exploded isometric view of the two control cams which are positioned at each side of the machine.
Figure 12:
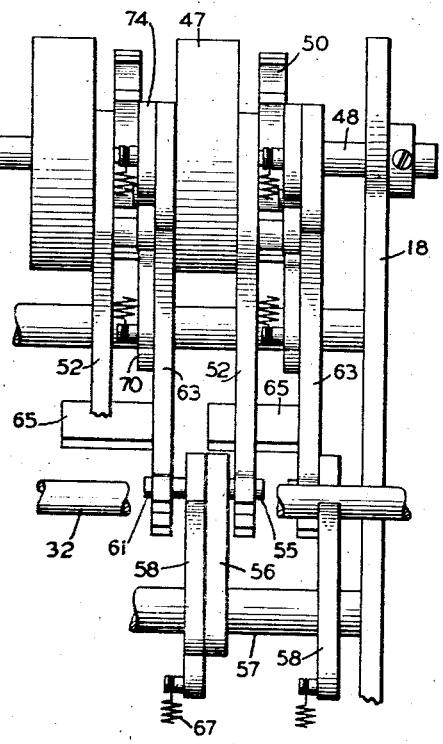
Fig. 12 is a rear elevation of the two indicator wheels of the highest order and the compensating devices therefor, many parts being omitted for the sake of clearness.

The gear 50 of the dial 47 is driven from the resultant gear 40 of the accumulator through a floating idler gear 51 journaled on a stud supported by a plate-like lever 52 which is pivoted on the sleeve which connects the dial with said gear 50. The lever 52 is rocked through a pin and slot connection 53, 54, by an arm 56 pivoted on a shaft 57. Said arm 56 is secured to a threearmed lever 58, also pivoted on the shaft 57 and having a pin 61 engaging a slot in a follower lever 63, pivoted on the shaft 48. The shape of this lever is shown in Figs. 4 and 12. It has a branch 65 which is formed off horizontally to the right and which acts as a follower resting on the snail cam 41 of the next lower denomination. It is pressed against the cam by a spring 67 (Fig. 2) acting on an arm of the lever 58. The lever 52 is on the lefthand side of the dial (on the right in Figs. 3 and 12) and the lever 63 is on its righthand side, and the two levers swing in unison, constituting in effect a yoke whose righthand arm rests on the snail cam 41 of next lower order and whose lefthand arm swings the idler pinion 51 slightly frontward and rearward, imparting a slight rotation to the dial to compensate for the fractional positions of the resultant gear 40. The pins 55 and 61 are in effect one pin. The yoke 63, 52 serving the dial of highest order, is shown in rear view in Fig. 12. The arm 56 is made as a separate piece and is secured to the lever 58 by a bolt 60 in order to provide an adjustment between the follower 65 and idler 51 controlled by it. The above described construction is modified in the units place as will be described presently, and in the highest order there is an extra lever 63 and 58 for reasons that will appear hereinafter.

Fig. 2 shows the train in tens place, the accumulator in zero position and out of mesh with the actuator 14, and the followers 65 resting on the cams 41. The arm 63 and snail cam 41 here shown are those for the tens wheel, but said arm 63 has its follower branch 65 on the units snail cam. The follower 65 shown in section, is resting on the tens snail cam and controls the gear 51 of hundreds order. In this position the dials 47 show zeros. If, however, the units wheel was turned to register some digit, the creep carry would turn the tens gear 40 counter-clockwise a corresponding fraction of a tooth space, which would tend to turn the tens dial 47 to a fractional position. But the units wheel would cause its snail cam to swing the tens yoke 63, 52 rearward, causing idler gear 51 to roll on gear 40 tending to turn the tens dial clockwise to compensate for the fractional rotation of tens gear 40, and the tens dial would still register zero exactly. The follower engages the low part of the snail cam in zero position and the high part at nine.

In order to swing all of the yokes 52, 63 rearward to lift the followers 65 off of the snail cams 41, the following means are provided. A bail bar 32 extending across the back of the machine is supported at its ends by angled arms 31 pivoted on the projected ends of the fixed shaft 20. Each arm 31 has at its elbow a stud 30 playing in a cam slot 28 in a horizontal hand lever 26 pivoted on the end of the fixed shaft 13. The cam slot 28 consists of two dwells at different distances from the pivot 13 and connected by an incline. The construction is such that if the forward ends of the levers 26 be depressed from the position shown in Fig. 1, the yoke 32, 31 will be swung clockwise, moving the bar 32 upward at a forward inclination. When, however, the accumulator is swung into and out of mesh with its racks in a succession of computing operations, the bar 32 remains fixedly in the position shown in the drawings. Each of the levers 58 which control the yokes 52, 63, has a third arm which normally lies under the bar 32, as shown in Fig. 2. When the accumulator is swung clockwise into the meshing position shown in Fig. 6, the pivot 57 of the levers 58 moves with it, but the levers 58 are obstructed by the bar 32 and are forced to turn counter-clockwise to lift all of the followers 65 off of the snail cams, as shown in said Fig. 6. When the accumulator wheels are being turned, therefore, these followers are out of the way and do not interfere with reverse rotation of the snail cams in subtraction.

In taking totals and clearing the accumulator, however, the followers 65 each cooperating with the radial drop in its associated snail cam 41, are used as stops to arrest the resultant wheels of the accumulator at zero. Before swinging the accumulator into mesh for that operation, the levers 26 are operated to swing the bail bar 32 out of the way, so that, as far as said bar is concerned, the followers are free to drop onto the cams.

In units order (Fig. 11) the sleeve 46 is held in fixed position by a spacer block 100 secured to the righthand plate 18 of the accumulator frame. Also the arms 56 and 58 are spaced apart by a hub 76, and the pin 61 of the latter arm rests on any convenient fixed part when it is released from the restraint of the rod 32. When so released (Fig. 2) the other arms 63 assume different positions depending on the snail cams 41, but this one always drops down its full extent, there being no snail cam to the right of it.

When the accumulator is clear, and the followers rest on the snail cams (Fig. 2), the dials all indicate zero; and when the yokes 63, 52 are lifted (Fig. 6) the floating pinions turn them back one tooth space to indicate nine. In the latter position there is, of course no compensation of the dials and, when a total has been accumulated each dial stands in a position one tooth space short of the position of its associate resultant wheel 40, including the fractional position. Thus, if the total is 00777, the hundreds wheel 40 stands at 7.77, and when the yokes are lifted as in Fig. 6, the hundreds dial will indicate 6.77. If then the parts be moved to the position of Fig. 2, the bodily motion of the pinion 51 will turn the dial 47 forward to the extent of 0.23 tooth space, when it will be arrested by the snail cam in tens place and the dial will indicate "7."

When the accumulated total includes a succession of nines, the resultant wheels 40 and cams 41 of the higher orders stand practically at zero, and if the followers 65 were then allowed to engage the cams, the corresponding dials would indicate zero instead of nine. Also if said followers were then used to arrest the snail cams in clearing the accumulator, they would arrest them at once, instead of allowing them to turn backwards the required nine teeth. Means are, therefore, provided, according to the present invention, to delay the engagement of these followers with their cams under the conditions mentioned.

Figure 6:
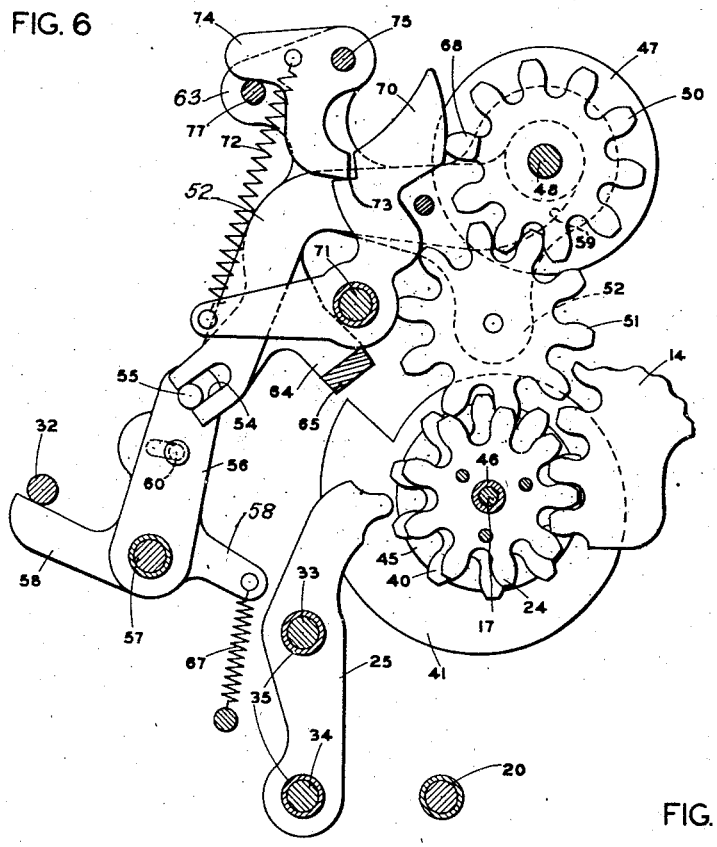
Fig. 6 is a cross sectional view similar to Fig. 2 of the accumulator mechanism without the supporting framework and shows the accumulator in mesh with its actuators.
Figure 8:
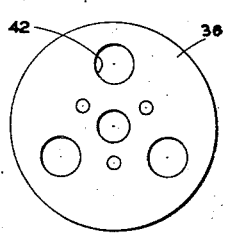
Fig. 8 is a side elevational view of the three hole coupling disc which is one element of the accumulator.
Figure 9:
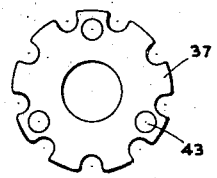
Fig. 9 is a side elevational view of the eccentric gear which is another element of the accumulator.
Figure 10:
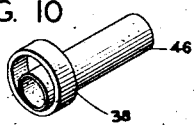
Fig. 10 is an isometric view of the eccentric bearing and sleeve which control the eccentric gear shown in Fig. 9.
Figure 7:
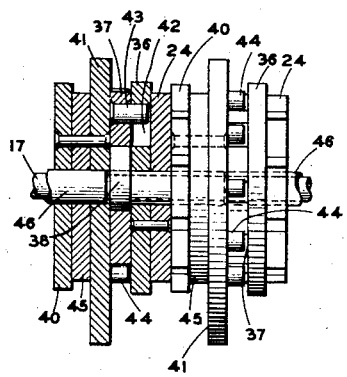
Fig. 7 is a front view of two orders of the accumulator mechanism with one order shown in section.

The dial indicators 47 are turned by the gears 50 and on one of the gear teeth of each of these wheels is a lug 68 the same size as the tooth, but extending to one side thereof (see Figs. 4 and 6). A series of pawls 70 is rotatably mounted on a rod 71 to sense these lugs as the wheels 50 turn under the driving action of gears 51 and 40. The pawls 70 are each urged toward the shaft 48 by a spring 72 attached to a lug on the backward extremity of the pawl. A small notch 73 is cut in the back of the pawl to be engaged by a latch member 74. The rod 71 is secured to the rockable frame pieces 18 so that the relative position of the pawls 70 and the gears 50 remains unchanged as the accumulator is rocked into mesh.

The series of latches 74 is rockably mounted on a series of pins 75 which are secured to extensions of the arms 63. The latches 74 are stressed by the springs 72 to move in a counter-clockwise direction as viewed in Figs. 2 and 6, but limit pins 77 keep the latches from engaging the pawls 70 until the pawls are forced out by the lugs 68 and the cam followers 65 have been lifted clear of the cams 41 as shown in Fig. 6, where the dial 47 is in position to indicate "9."

When the yokes 63, 52 are withdrawn to their rear positions by the action of the bar 32, all of the latches 74 are raised high enough to engage the shoulders of the pawls 70, and they will engage such shoulders in every instance where the pawl is held back by the tooth 68. Said pawl is so held when the resultant wheel and snail cam stand at or approximately at zero.

*Operation*

To enter an amount into the accumulator for addition, the accumulator shaft 17 is moved backward out of mesh with the key sectors 14 by pushing the handles 23 back. The keys 12, which are now free, are manually set at the number which is to be added into the accumulator, and the handles 23 pulled forward to mesh the numeral wheels 24 with the key sectors 14. Then the keys 12 are rotated to the zero or lowest position in any order desired and the amount is run into the accumulator. Any number of amounts may be added in this manner within the capacity of the machine.

If it is desired to subtract a number from the accumulator the numeral wheels 24 are engaged by the key segments 14 when the keys 12 stand at zero. Then the keys are moved to the digits on the keyboard corresponding to the number to be subtracted, the accumulator shaft 17 is moved back out of mesh with sectors 14, and the keys returned to zero.

It will be obvious from the above that to add or subtract numbers it is only necessary to turn the numeral wheels of the accumulator in an additive or subtractive manner, no additional operation for tens carry being necessary.

When the accumulator is moved forward with rod 32 retained in its backward position (see Fig. 6) pins 55 and 61 acting against the sides of slots 54 and 62, respectively, will lift arms 52 and 63 so that cam follower 65 is clear of snail cam 41 and the intermediate gear 51 has been rotated with respect to gears 40 and 50 to turn the dial indicator back one-tenth of a revolution, or in other words, "one" is subtracted from the readings of the dial indicators in every denominational order and a row of nines will be shown instead of zeros. After the numbers have been entered into the accumulator wheels, the accumulator mechanism is cammed back into the position shown in Fig. 2, and if the accumulator happens to be in its zero position the cam followers 65 will sense the lowest portions thereof and move the intermediate gears 51 into their original position, thereby adding "one" to the dial indicators and showing a row of zeros.

At the end of each problem, it is necessary to clear the accumulator before the next problem is started and this is done as follows:

By means of handles 23 and 27, shaft 17 and short pins 30 are cammed to their forward positions while the keys 12 are at zero. This action allows the numeral wheels 24 to engage the key sectors 14 while the cam followers 65 are urged into contact with the snail cams 41. The keys 12 are then moved up as far as they will go, that is, they turn the accumulator mechanisms until the drop faces of the snail cams 41 move into contact with the cam followers 65. When the keys have all been rotated to this position the accumulator has been zeroized or cleared, the position of the keys on the keyboard shows the total, and the dial indicators 47 all read zero.

To illustrate the operation of the reading dial indicator wheels 47 let it be assumed that the number "7" has been entered into the accumulator in an additive direction in the units denominational order. This will cause the ten tooth resultant wheel 40 in that order to move seven teeth in counter-clockwise direction as viewed in Fig. 4. The sleeve 46 which carries the eccentric bearing 38 is pinned to the resultant gear 40 of the units order and extends into the tens order where the eccentric bearing acts as a mounting for the floating gear 37. In the tens order the numeral wheel 24 is held stationary because it is meshed with a key sector which does not move. As the floating gear 37 is moved around by the eccentric bearing 38 it turns the tens resultant wheel 40 seven-tenths of a digit space or seven hundredths of a complete revolution.

In a similar manner the resultant wheel of the hundreds order moves seven hundredths of a digit space or seven thousandths of a revolution.

In accordance with the proper sequence of operations, the shaft 17 was moved toward the front of the machine before the "7" was entered into the accumulator. This action lifted all the cam followers 65 from the snail cams 41 and moved the intermediate gears 51 horizontally with respect to the gears 40 and 50. The effect of this motion, as explained above, is to subtract a unit from each of the reading indicator dials, hence they would show a row of "9's" before the "7" was added. After the "7" is added the units indicator dial shows a "6" and the tens indicator dial is in a position which shows a portion of both the "9" and "0" figures, that is, the dial has been rotated to a position to indicate nine and seven-tenths. In a similar manner the hundreds order indicator will be at its nine and seven hundredths position and the thousands order will be at its nine and seven thousandths position.

Shaft 17 is now moved back to its first position (shown in Fig. 2) where the detents 25 again engage the numeral wheels 24 and the cam followers 65 engage some portion of the snail cams 41. The snail cam in the units order has been turned seven tenths of a complete revolution and the cam follower will come to rest on a portion that is equal to seven tenths of a maximum displacement produced by the cam. In a similar manner the cams in the tens, hundreds, and thousands orders will displace the cam followers .07, .007, and .0007, respectively, of the maximum amount.

When shaft 17 is moved back, the indicator dials on all those orders in which there has been no accumulator movement will turn one digit space, from "9" to "0." All other dials will be moved forwardly one digit space minus the amount registered on the snail cams in the next lower order. That is, the units dial will always be moved forwardly one digit space because there is no lower order. The tens indicator will be moved forwardly one space minus the amount (.7) that is due to the position of the cam in the units order. Since the tens indicator stood at "9.7" the final position will indicate a "0."

The hundreds indicator will, in a similar manner, be moved forwardly one space minus the amount on the snail cam of the tens order and the final position will also be "0."

All the other indicators will be subjected to similar motions and the net result will be that all the dials read "0" except the units order which reads "7."

Let it be assumed now that "93" is to be added to the "7" already set up in the accumulator. The tens key is set at "9" and the units key at "3." Then the accumulator shaft 17 is moved forward by the manual movement of handles 23. The keys are returned to the "0" marks and the shaft 17 is moved back to its previous position. The successive movements of the accumulator wheels 40 and the indicator dials 47 are best shown by the following table in which is recorded the action when "7" and "93" are added by the present machine.

| | Denominational orders | | | | |
|---|---|---|---|---|---|
| | Ten thousands | Thousands | Hundreds | Tens | Units |
| First number entered | 0 | 0 | 0 | 0 | 7 |
| Movement of resultant wheels | .0007 | .007 | .07 | .7 | 7 |
| Dials—front position | 9.0007 | 9.007 | 9.07 | 9.7 | 6 |
| Dials back | 0 | 0 | 0 | 0 | 7 |
| Second number entered | 0 | 0 | 0 | 9 | 3 |
| Movement of resultant wheels | .0093 | .093 | .93 | 9.3 | 3 |
| Final position of resultant wheels | .01 | .1 | 1 | 0 | 0 |
| Dials—front | 9.01 | 9.1 | 0 | 9 | 9 |
| Dials—back | 0 | 0 | 1 | .0 | 0 |

The correct result "100" is indicated by the reading indicator dials while the amount of creep still exists in the accumulator mechanism.

In order to explain the operation of the latch 70 and its associated pawl 74, let it be assumed that the accumulator has been cleared and then a "one" subtracted. The successive steps of this operation will be as follows:

With the keys at their zero positions (Fig. 2) shaft 17 is moved forward (Fig. 6). This changes the indicating dials from a line of zeros to a line of nines as hereinbefore described. The yokes 63, 52 are all swung back to the position shown in Fig. 6, bringing all of the latches 74 to the level of the notches 73 in the pawls 70. As all of the dials are brought to their nine positions, all of the pawls 70 will be moved by the lugs 68 back into locking engagement with said latches as shown in Fig. 6. Then the units order key 12 is moved up one digit space on the keyboard, which action turns the units order accumulator wheel one digit space in the negative or subtractive direction and moves the indicating dial a like amount, thereby indicating an eight instead of a nine. The tens order accumulator is moved only a small amount due to the creep from the units order. As the units order movement is a minus "one" the tens order creep is one-tenth of a tooth space in the negative direction, some of which is absorbed by the backlash and loosely fitting gears. The final position of the tens order mechanism is indicated in Fig. 6 where the snail cam 41 is shown with its high point just under the cam follower 65. Theoretically, the hundreds wheel is moved .01 tooth space, the thousands wheel .001 tooth space, etc. In practice, these movements are negligible so that, practically, these higher wheels all register zero. Of course, the wheels would be brought to these same positions by adding 99999 instead of subtracting 1.

Shaft 17 is now moved back to its reading position and the units order dial indicator moves to its nine position. When the units wheel was turned from 0 to 9, the tens dial 47 was turned from 9 to 8.9. This dial now starts to move toward its zero position but the cam follower 65 in this order meets the snail cam 41 of the units order which stands at its nine position. The tens dial indicator will, therefore, stop at its nine position.

As long as the tens indicator remains in its nine position, the lug 68 on gear 50 occupies the position shown in Fig. 6 and holds the latch 70 in a rearward position so that the point of pawl 74 pivoted to the yoke 63, 52 of hundreds order engages the notch 73 and holds said yoke in a raised position regardless of the position of the snail cam. As explained above, the gear 51 is rotatably mounted on the rockable plate 52 of that yoke. Therefore, the latching of pawl 74 in the tens order retains the intermediate gear 51 in the hundreds order in its rear position in moving to which it had rotated the indicating dial one digit space in a subtractive direction.

The above condition also exists in all orders above the tens order, the latches 70 and pawls 74 cooperating to retain the reading of nine in each order notwithstanding the fact that the snail cams are not in position to hold up the follower 65. It should be pointed out that the latch and pawl mechanism does not rotate the nines into position when a one is subtracted, the mechanism merely holds them there and prevents the dial indicators from rotating back to zero when shaft 17 is pushed back into reading position.

It may also be noted that, though all of the higher yokes 63, 52 are held up by their latches 74, 70, due to the fact that the units wheel stands at 9, there is no cumulative error in the positions of successive yokes. In the devices for printing significant zeros in listing adding machines, when the thousands hammer latch is raised, it raises the hundreds latch which in turn raises the tens latch and that the units; and if there is any looseness in the parts, each successive latch is raised slightly less than the one at its left. In the present mechanism, the effect of the nine position of the units wheel is carried back successively to the tends, hundreds, etc., orders; but in each order the yoke is held up, not by the yoke at its right, but by its own latch 74 engaging its pawl 70, which pawls are mounted on fixed pivots, so that all of the yokes are held at exactly the same height. This results from the fact that the yokes are all first raised to their full height, and each one is then locked up by its own latch devices.

In order to describe the unlatching of the pawl and latch combination, let it be assumed that the row of nines is left in the machine and a "one" added to it. The operation will be as follows:

With the shaft 17 in its rear position, the first or units key 12 is set at "1" on the keyboard, then shaft 17 is moved forward and the key is returned to its zero position. When the shaft 17 was moved to its forward position, the units dial indicator moved to "8" but the others remained at "9" since they were latched up or held by the snail cam. When the "1" is added the "8" is changed to a "9." When, thereafter, shaft 17 is again moved back to the reading position, the units indicator moves to a "0" showing, while the remaining dials retain their "9" position for an instant because the latch 70 holds up the lever 63 by means of pawl 74. However, as the units indicator wheel is turned to its zero position the lug 68 on wheel 50 is turned out of contact position and latch 70 resumes its normal position (rotating clockwise in Fig. 6). This releases pawl 74 and the yoke 63, 52 in the tens order drops to normal position, moving intermediate gear 51 forward and changing the tens dial indicator from a "9" to a "0." This action removes the lug 68 in the tens order from the cooperating latch 70 and the same train of operations continues as described above, all the orders being unlatched and normalized in sequential order. The time required for a complete unlatching of all orders depends upon the inertia of the parts and the spring tension provided in springs 67 and 72. In a machine made in accordance with standards usually found in such calculating mechanisms, the total unlatching time for all orders in succession was less than one-fifth of a second. The operation just described occurs on a succession of zeros in the total, and it is the only occasion in the operation of the accumulator when an action occurs successively from order to order. This successive action occurs when the wheels are moved out of mesh to read a total, and at that time the small fraction of a second does not slow the operation of the machine. The dials come to zero more quickly than the eye can read them.

When a number of amounts have been entered into the accumulator and the total noted, it may be desired to zeroize the machine so that another series of numbers may be entered. This operation is accomplished as follows:

Shaft 17 is moved forward by pulling levers 23 to their forward positions. Shaft 32 is also moved upward and forward by levers 26. The keys 12 are then moved from their zero position upward as far as they will go. The result on the keyboard is the same total that had been accumulated in the accumulator units. The dials indicator wheels in this position show a row of nines but, when shafts 17 and 32 are moved backward, the dials show zero and the machine is normalized and ready for another adding operation.

During the above operation, the forward position of shaft 32 allows the cam followers 65 to rest on the snail cams 41, hence when the keys are moved upward the snail cams move in a subtractive direction until stopped by the cam followers engaging the radial portions of the cams.

A study of the schematic diagram (Fig. 13) may serve to clarify the principle of the mechanism. Here the several dial trains are shown each in face view, and the levers and latches which control them are distorted in shape accordingly. Each pair of levers 52 and 63 is shown connecting two denominations, being connected to swing together by the built-up lever 56, 58, so that when a lever 63 has its follower 65 resting on the snail cam of one order, it controls the position of the lever 52 and, consequently, of the floating pinion 51 of next higher order. The bar 32 is represented by a longitudinal bar having lugs which control the lower ends of the levers 58. If this bar was moved to the right, or if the balance of the mechanism was moved to the left, it would lift all of the followers 65 off of the cams 41. In units place, the single lever 58 is limited in its clockwise motion by a fixed stop 582. In the highest order, the single follower lever 63 can also be lifted away by the bar 32. It is believed that the distorted forms of the latching devices 70, 74 will be recognized. That in highest order is differently distorted in form, because the lever 63 must be locked up directly instead of indirectly through the parts 52, 55 and 61 as in the other denominations.

Figure 13:
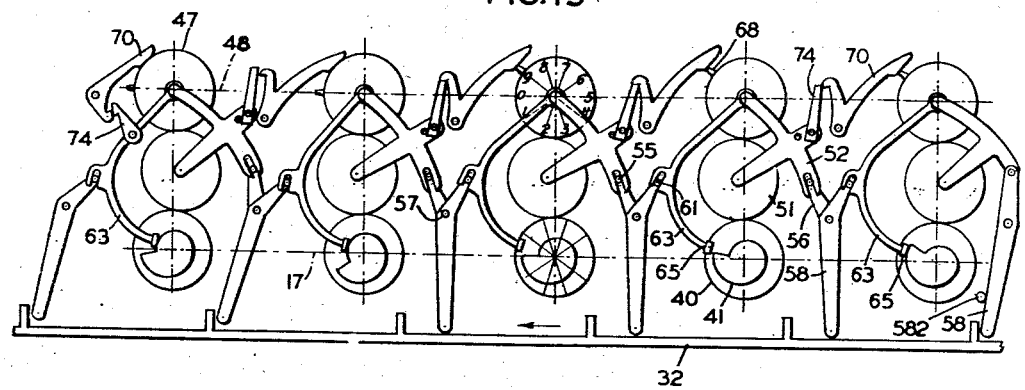
Fig. 13 is a schematic view illustrating the principle of the invention, the total registered on the accumulator and indicated in its true amount on the indicator being 00999.

In this Fig. 13, the accumulator registers a total of 00999 which is indicated on the dials 47 in its true amount. The precise instant represented is that preparatory to clearing the totalizer. The bar 32 has been shifted to the left (upward and forward in the illustrated machine) and the accumulator has been swung into engagement with the racks 14. It will be noted that the snail cams 41 stand as follows: units at 9, tens at 9.9, hundreds practically at 0, thousands practically at 1 (theoretically at 0.999) and tens of thousands practically at 0.1. Before the accumulator was swung out of mesh after adding 999 (that is to say, when the parts were in Fig. 6 position), the units dial stood at 8 and the pawl 70 was swung clockwise where its notch was out of reach of the tens latch 74. The tens dial 47 stood at 8.9, so nearly 9 that it had deflected pawl 70 so that the latter engaged the hundreds latch 74 and was conditioned to prevent the hundreds yoke 63, 52 from dropping. The hundreds dial stood practically at 9 as shown. The thousands dial stood practically at 0, and, therefore, did not cause pawl 70 and latch 74 to lock the tens of thousands yoke up. The extra lever 63 bearing on the highest snail cam was latched up, because its dial stood nearly at 9.

When the bar 32 was shifted to the position shown, all of the levers 58 which had been held in their extreme positions, tended to rock clockwise, and all of them did so rock until arrested in some way. In the case of the hundreds and thousands wheels, this was only the slight motion required to take up whatever clearance there was between the latch 74 and the notch in the pawl 70. At the beginning of the movement of the bar 32, the right-hand pawl 70 was not held back in the path of latch 74 and this yoke 63, 52 and lever 58, therefore, followed the bar 32 until the follower 65 was arrested by the high part of the units cam 41. There was no snail cam to arrest the units lever 52, which, therefore, made its complete movement until arrested by its lever 58 striking the fixed stop 582. In this movement the units dial 47 turned from its 8 to its 9 position and deflected the pawl 70; but by that time the latch 74 had already moved upward (downward in the illustrated machine) and was out of range of the notch in the pawl. It will be perceived that this first pawl 70 and latch 74 are not needed and may be omitted. This one-tenth movement turned the tens dial from 8.9 to 9 exactly. Before the shifting of the bar 32, the hundreds dial had stood at 8.99, and its position was practically unchanged. To the eye, this position is indistinguishable from 9. The thousands dial had stood practically at 0, where it was retained by the action of the latch 74, etc. Being in that position, its tooth 68 had not deflected the pawl 70, and consequently the yoke 63, 52 for the tens of thousands wheel moved down until arrested at nine-tenths of its full movement by the thousands snail cam. As this last dial had indicated 9.1, this movement advanced it to 0. This moved its lug 68 away from its pawl 70, allowing the last follower 65 to drop onto the cam.

A resultant wheel of a creep carry accumulator is driven by differential gearing as follows: It is turned whole tooth spaces by the numeral wheel 24 of the same order, ten-tooth spaces by the numeral wheel of next lower order, hundredth-tooth spaces by the next wheel, etc. The point or short zone in which the latch devices 74, 70 are needed, is in a fractional position more than nine and not quite ten, but so nearly ten that the follower would or might fall in front of the radial drop of the snail cam. It will be noted from the above description, and referring to the units order, that the fact that that wheel stands at 9 is not by itself sufficient to set the latch. The next latch is set by the joint action of the tens wheel registering 9 and the units wheel also registering 9, the latter condition adding 0.9 tooth space to the tens snail cam and to the tens dial 47, bringing the former into the critical zone and bringing the lug 68 on the latter into position to set the pawl 70.

In the hundreds order, the hundreds numeral wheel 24 turned the snail cam to 9, the tens numeral wheel advanced it 0.9 further, and the units numeral wheel 0.09 further, bringing it theoretically to 9.99, lacking only 0.01 tooth space of the zero position. Let us assume that there is so much looseness and inaccuracy in the mechanism that, with the tens wheel standing at 9.9, the follower 65 would fall to the low part of the cam. Nevertheless, it will not so fall, due to the latch being set by reason of the units wheel standing at 9. It is then the units wheel, causing the tens latch to be set and preventing the follower from falling on the tens cam, that indirectly retains the hundreds latch set, and cause the hundreds dial to register correctly and prevents the snail cam in hundreds order from being arrested prematurely on clearing. The 0.01 tooth space on the hundreds wheel is, in effect, measured on the units wheel, where it is a whole tooth space.

The 0.1 tooth space which the tens wheel lacks of reaching zero, is a whole tooth space on the units wheel and, by the mechanism of the invention, it is measured on the latter wheel. Also, the 0.01 tooth space on the hundreds wheel is measured on the units wheel, where it is a whole tooth space. Thus, the difficulty in creep carry accumulators, of measuring fractional tooth spaces, is eliminated. The mechanism is set by whole tooth spaces.

Even in the example given hereinbefore, where one was subtracted from a clear accumulator and the highest wheel theoretically lacked 0.0001 tooth space of zero, the latches were all set, the dials all indicated 9, and, as will presently appear, if all of the wheels be cleared by moving the actuators in unison, this last wheel would yield 9 along with the others. The minute fraction of a tooth space was measured on the units wheel, where it was a whole tooth space.

Creep-carry accumulators are usually cleared by moving the actuating racks subtractively one at a time, beginning with units, and this has been one of the principal draw-backs of such accumulators. The present accumulator may be cleared in that way, but the present improvements make that unnecessary. All orders may be cleared simultaneously, as is commonly done with accumulators of other types. With the parts in the positions shown in Fig. 13, if all of the racks 14 be moved subtractively in unison, each until arrested by the radial drop of its associate snail cam striking the follower 65, the operation is as follows: The units wheel is obviously free to turn nine teeth, when it will be arrested to indicate a total of 9. The tens snail cam already stood at 9.9 and its follower was held off by the units cam. If the high part of this cam was not already safely under its follower, it will move under it immediately the motion begins. During the first tooth-space of rotation, the tens lug 68 will move to its "8" position, releasing the pawl 70 and permitting the tens follower 65 to fall onto the snail cam. The hundreds snail cam stood at "0," and its high part immediately advanced under its follower. Meanwhile, the hundreds lug 68 was moving away from its pawl 70, which released the latch 74 at some point before said lug reached its "8" position; and by that time the high part of the snail cam was safely under the follower. In short, by the time the racks have advanced and the wheels have rotated one tooth space, all of the snail cams that had stood practically at zero but whose real total was nine, will have gotten safely under their followers, and the clearing of the accumulator will then proceed much as in accumulators of other types. As each resultant wheel approaches its zero position, it gradually eliminates the fractional position of the next wheel to the left and when all have reached zero all such fractional displacements will have been eliminated.

It may be worth while to trace this elimination of fractional displacements more in detail as it occurs in the thousands and tens of thousands orders in the above example. The total in thousands place was "0," but the snail cam stood practically at "1," and during the first tooth-space movement in the simultaneous advance of the racks 14, the thousands cam 41 and rack 14 advanced beyond zero almost a tooth space before being arrested. Reverting to the creep-carry mechanism (Fig. 4), when the eccentric 38 rotates, the interaction of the floating gear 37 and the internal gear 41, 44, tends to produce a relative rotation of the two gears. In adding, the internal gear turns forward, because the floating gear is prevented from turning by reason of the engagement of the gear 24 with the rack; but in the clearing operation now being described, after the first tooth-space movement, the snail cam is locked and the rack is in a movable condition. At this time, the hundreds wheel stands at 8.8 and is turning subtractively, turning the thousands eccentric 38 with it. The continued rotation of this eccentric, therefore, rotates the floating gear 37 and gear 24 in thousands place in the reverse direction, and gradually brings the thousands rack 14 back to its zero position. This it can do, because the hundreds rack 14 has a nine to one leverage on the thousands rack. A somewhat similar action occurs in the tens of thousands place, but to a less extent.

The above analysis is made on the assumption that all of the racks 14 are started together in the clearing operation. However, the racks may be moved one at a time in any desired order, as will be apparent on tracing the movements on the diagram, Fig. 13.

The range in the rotation of a dial 47 during which the lug 68 should or may cause the pawl 70 to engage and retain the latch 74, is not inflexible, except that the followers 65 must be held off of the snail cam until the high part of the latter is safely under the former. How long that is, depends upon the clearances allowed and the looseness or backlash in the actual mechanism. As far as restoring the accumulator to zero is concerned, the lug 68 could extend rightward in Figs. 6 and 13 for several tooth spaces without any harm. For the purposes of reading the total from the indicator dials, however, the pawl 70 should not be held deflected too long. If the stud 68 covered the seven position, for example, the yoke 52, 63 of tens order, would be locked up in some instances when the follower should rest on the snail cam, with the result that the hundreds dial 47 would show a fractional displacement. In the instance illustrated in the drawing the pawl 70 is deflected far enough to engage the latch 74, at some point between zero and nine; and it has dropped back to release the latch by the time when the dial reaches eight. In some of the claims the somewhat indefinite range in which the latch 74 is engaged by the pawl 70 is expressed by the phrase "approximately nine."

The means for rotating the floating gear 37 comprising the three studs 43 playing in the three holes 42 in the disc 36, which disc is secured to the numeral gear 24, is not claimed herein but is claimed in another application of mine While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In an accumulator of the class described, having a plurality of denominational orders, each of which contains a numeral gear and a resultant gear, coupling means connecting the numeral gear of each order to a resultant gear in the same order, eccentric coupling means connecting the resultant gear of each order to the resultant gear in the next higher order in a ten to one ratio to transmit tens carry amounts, means for visually indicating the accumulated amounts in each denominational order, said means comprising a floating pinion meshing with the resultant gear and an indicating wheel rotated by the floating pinion, and compensating means for removing carry amounts less than one from said indicating wheels, said compensating means comprising a snail cam rotating with the resultant gear and a cam follower engaging said snail cam and controlling the position of the floating pinion in the next higher order.

2. An accumulator of the class described comprising a plurality of denominational order sections, a numeral wheel in each order by which amounts may be entered into that order, a resultant wheel in each order for determining the accumulated value of the amounts entered, eccentric coupling means for connecting the numeral wheel in each order to the resultant wheel in the same order, reduction differential planetary gearing coupling the resultant wheel in each denominational order to the resultant wheel of the next higher order, means for visually indicating the accumulated amounts in each denominational order, said means comprising a floating pinion and a dial indicator wheel, said pinion being connected between said resultant wheel and said dial indicator wheel; compensating means for removing the fractional carry movement from the dial indicator wheels, said means comprising a snail cam rotating with each resultant wheel and a cam follower engaging said snail cam and controlling the position of said floating pinion; latching means for holding the cam follower disengaged from the snail cam when the dial indicator wheel stands at or approximately at the nine position, said latching means comprising a lug on the dial indicator wheel, a pawl engaged by said lug, and a latch mounted on the lever arm on which the cam follower is secured and adapted to engage the pawl when set by said lug.

3. A visual indicator mechanism for showing the true value of the accumulator actuated by a series of actuators and having a creep carry mechanism and a resultant gear for each denominational order, said indicator mechanism comprising a snail cam rotating with each resultant gear, a visual indicator dial geared to each of said resultant gears by means of a floating pinion, rockable lever arms on which the pinions are rotatably mounted, cam follower mechanisms for positioning said lever arms in accordance with the rotation of said snail cams, means to disengage said followers from the cams, and latching means for retaining a cam follower disengaged from the snail cam when the visual indicator dial of the next lower order stands at or approximately at the nine position, said latching means comprising a lug on each dial indicator wheel, pawls engaged by said lugs, and a series of latches mounted on the lever arms on which the cam followers are secured.

4. The combination with a series of accumulator actuators, of a creep-carry accumulator having in each denomination a numeral wheel driven by its actuator and a resultant wheel driven by its numeral wheel and by the creep-carry mechanism from the next lower resultant wheel in such manner as to move said resultant wheels to fractional positions when numbers are added, a snail cam rotating with each resultant wheel, a dial wheel for each resultant wheel, a floating pinion to transmit motion from each resultant wheel to its dial wheel, a movable member on which said floating pinion is journaled, each such movable member above that of lowest order having a follower to cooperate with the snail cam of the next lower order, means for moving the accumulator to bring said numeral wheels into and out of mesh with said actuators, means acting when the accumulator is moved into engagement as aforesaid to lift said followers off of the snail cams and thereby rotate said dial wheels in subtractive direction so that when the accumulator is in mesh each dial wheel stands in a position one digit space short of the position including fractional movements occupied by its associated resultant wheel and said means acting when the accumulator is moved out of mesh to restore said followers to contact with said cams and thus to add on each dial wheel one-tenth of the tens complement of the amount indicated on the resultant wheel of the next lower order thereby eliminating from the dial wheels the fractional displacement of the resultant wheels of the accumulator.

5. The combination with a series of accumulator actuators, of a creep-carry accumulator, a numeral wheel in each order by which amounts may be entered into that order by the associate actuator, a resultant wheel in each order for registering the accumulated value of the amounts entered, differential gearing connecting the resultant wheel in each order with the numeral wheel in the same order and with the resultant wheel of the next lower order, means for visually indicating the accumulated amounts in each denominational order, said means comprising a floating pinion and a dial indicator wheel, said pinion being connected between said resultant wheel and said dial indicator wheel, a snail cam rotating with each resultant wheel, a movable member on which said floating pinion is journaled, each such movable member above that of lowest order having a follower to cooperate with the snail cam of the next lower order, means for moving the accumulator to bring said numeral wheels into and out of mesh with said actuators, means acting when the accumulator is moved into engagement as aforesaid to lift said followers off the snail cams and thereby rotate said dial wheels in subtractive direction so that when the accumulator is in mesh each dial wheel stands in a position one unit space short of the position including fractional movements occupied by its associated resultant wheel and said means acting when the accumulator is moved out of mesh to restore said followers to contact with said cams and thus to add on each dial wheel one-tenth of the tens complement of the amount indicated on the resultant wheel of the next lower order, thereby eliminating from the dial wheels the fractional displacement of the resultant wheels of the accumulator.

6. The combination with a series of accumulator actuators, of a creep-carry accumulator, a numeral wheel in each order by which amounts may be entered into that order by the associate actuator, a resultant wheel in each order for registering the accumulated value of the amounts entered, differential gearing connecting the resultant wheel in each order to the numeral wheel in the same order and with the resultant wheel of the next lower order, a dial wheel, a floating pinion connected between said dial wheel and said resultant wheel, a snail cam rotating with each resultant wheel, a movable member on which said floating pinion is journaled, each such movable member above that of lowest order having a follower to cooperate with the snail cam of the next lower order, means for moving the accumulator to bring said numeral wheels into and out of mesh with said actuators, disengaging means acting when the accumulator is moved into engagement as aforesaid to lift said followers off the snail cams and thereby rotate said dial wheels in subtractive direction so that when the accumulator is in mesh each dial wheel stands in a position one digit space short of the position including fractional movements occupied by its associated resultant wheel, latching means for retaining any snail cam follower in its disengaged position as the accumulator is moved out of mesh with said actuators when the snail cam stands in a fractional position between 9 and 10, said disengaging means acting when the accumulator is moved out of mesh to restore all of said unlatched followers to contact with said cams and thus to add to each associated dial wheel one-tenth of the tens complement of the amount indicated on the resultant wheel of the next lower order, thereby eliminating from such dial wheels the fractional displacement of the lower resultant wheels while retaining said displacement in the dial wheels in those orders where the followers have been latched.

7. The combination with a series of accumulator actuators, of a creep-carry accumulator having in each denomination a numeral wheel driven by its actuator, a resultant wheel driven by said numeral wheel and by the creep-carry mechanism from the next lower resultant wheel, and a dial driven by each resultant wheel, means for moving the accumulator to bring said numeral wheels into and out of mesh with said actuators, means acting when the accumulator is moved into engagement as aforesaid to subtract from the dial indicators one tenth of the tens complement of the amounts indicated on the respective resultant wheels of the next lower order, and the same means acting when the accumulator is moved out of engagement as aforesaid to add to the dial indicators one tenth of the tens complement of the amounts indicated on the respective resultant wheels of the next lower order.

8. In a creep carry accumulator having in each order a numeral wheel actuated whole tooth spaces and a resultant wheel rotated through differential gearing whole tooth spaces by the numeral wheel of the same order and fractional tooth spaces by the numeral wheels of lower order if any, the combination of cam followers, snail cams one rotating with the resultant wheel of each order and having its lower point at zero position, means to move said followers out of engagement with their cams, and to release them for reengagement, latching devices one for each follower to retain its follower out of engagement, and means in a certain order controlled jointly by the resultant wheel of the same order and a wheel of lower order to set the latching device in latching condition when the resultant wheel of said certain order theoretically registers a total greater than nine and approximating but less than ten.

9. In a creep carry accumulator having in each order a numeral wheel actuated whole tooth spaces and a resultant wheel rotated through differential gearing whole tooth spaces by the numeral wheel of the same order and fractional tooth spaces by the numeral wheels of lower order if any, the combination of stops to arrest the resultant wheels at zero when clearing the accumulator, cooperating stop surfaces on said resultant wheels, means to move said stops out of engagement with their said resultant wheels and to release them for reengagement, latching devices for said stops each to retain its said stop out of engagement, and means in a certain order controlled jointly by the resultant wheel of the same order and a wheel of lower order to set the latching device in latching condition when the resultant wheel in said certain order theoretically registers a total greater than nine and approximating but less than ten.

10. A visual indicator mechanism for showing the true value of an accumulator actuated by a series of actuators and having a creep carry mechanism, a numeral wheel, and a resultant wheel for each denominational order, said indicator mechanism comprising a snail cam secured to each resultant wheel, a floating pinion driven by each resultant wheel, a visual indicator dial driven by the floating pinion, a rockable arm on which the floating pinion is rotatably mounted, a cam follower rocking said rockable arm and engaging the periphery of said snail cam of the next lower order, means for lifting said followers from their cams and thereby subtracting from each dial indicator one-tenth of the tens complement of the amount indicated on the resultant wheel of the next lower order when the accumulator is engaged with said actuators and for restoring said followers to their cams and thereby adding a like amount to the dial indicators when the accumulator is disengaged.

11. In a creep carry accumulator having in each order a numeral wheel actuated whole tooth spaces and a resultant wheel rotated through differential gearing whole tooth spaces by the numeral wheel of the same order and fractional tooth spaces by the numeral wheels of lower order if any, each resultant wheel comprising a resultant gear and a snail cam, the combination of floating gears one rotated by each resultant gear, movable members on which said floating gears are journaled, followers for said cams each to move the said member and floating gear relative to the resultant gear of next higher order to impart small increments of rotation to said floating gears, means to move said followers out of engagement with their cams and to release them for reengagement, latches to retain said followers disengaged, and means actuated by said floating gears to set said latches each in dependence on the position of its floating gear.

HAROLD P. MIXER.